US012806647B2

(12) United States Patent
Böing et al.

(10) Patent No.: US 12,806,647 B2
(45) Date of Patent: Nov. 24, 2026

(54) PAINT MIST SEPARATOR DEVICE FOR ATTACHING TO A FILTER MODULE AND/OR SEPARATOR MODULE FUNCTIONING AS A PAINT MIST SEPARATOR

(71) Applicant: NEUFILTER GMBH, Gronau (DE)

(72) Inventors: Thomas Böing, Gronau (DE); Daniel Henke, Gronau (DE)

(73) Assignee: NEUFILTER GMBH, Gronau (DE)

( * ) Notice: Subject to any disclaimer, the term of this patent is extended or adjusted under 35 U.S.C. 154(b) by 489 days.

(21) Appl. No.: 18/562,280

(22) PCT Filed: May 10, 2022

(86) PCT No.: PCT/EP2022/062599
§ 371 (c)(1),
(2) Date: Nov. 17, 2023

(87) PCT Pub. No.: WO2022/248212
PCT Pub. Date: Dec. 1, 2022

(65) Prior Publication Data
US 2025/0091079 A1 Mar. 20, 2025

(30) Foreign Application Priority Data
May 28, 2021 (DE) ..................... 20 2021 102 947.1

(51) Int. Cl.
*B01D 45/08* (2006.01)
*B05B 14/43* (2018.01)

(52) U.S. Cl.
CPC .............. *B05B 14/43* (2018.02); *B01D 45/08* (2013.01)

(58) Field of Classification Search
CPC .......... B01D 45/08; B01D 45/06; B05B 14/46
See application file for complete search history.

(56) References Cited

U.S. PATENT DOCUMENTS

| | | | | |
|---|---|---|---|---|
| 5,799,339 A * | 9/1998 | Perry ....................... | A47K 1/14 4/286 |
| 7,947,123 B2 * | 5/2011 | Kwok .................... | B01D 45/08 126/300 |
| 2018/0356119 A1 | 12/2018 | Naughton et al. | |
| 2021/0046412 A1 | 2/2021 | Beier | |

FOREIGN PATENT DOCUMENTS

| | | | |
|---|---|---|---|
| CN | 110676594 A | 1/2020 | |
| CN | 209985061 U | 1/2020 | |
| DE | 102009022459 A1 | 10/2010 | |
| DE | 102014003608 A1 * | 9/2015 | ............. B05B 14/43 |
| WO | 0137972 | 5/2001 | |

OTHER PUBLICATIONS

International Search Report of Counterpart PCT International Application No. PCT/EP2022/062599.

* cited by examiner

*Primary Examiner* — Sharon Pregler
(74) *Attorney, Agent, or Firm* — LIU & LIU

(57) ABSTRACT

The invention relates to a paint mist separation device (10) for attaching to or in front of a filter module and/or separation module (12) which comprises, for example, at least one central face (14) as well as side faces (16, 18) laterally adjoining the central face (14) in each case, and which is attachable to the respective filter module and/or separation module (12) via the ends of the side faces (16, 18).

20 Claims, 10 Drawing Sheets

PAINT MIST SEPARATOR DEVICE FOR ATTACHING TO A FILTER MODULE AND/OR SEPARATOR MODULE FUNCTIONING AS A PAINT MIST SEPARATOR

BACKGROUND OF THE INVENTION

1. Field of the Invention

The invention relates to the technical field of separating particles entrained by an air stream (raw gas stream), namely, separating paint or lacquer particles entrained in a so-called paint mist (paint mist separation).

2. Description of Related Art

Devices for this purpose are already known, for example in the form of the filter module described in EP 2 532 409 B.

SUMMARY OF THE INVENTION

The object of the present invention is to further improve the separation of paint or lacquer particles, sometimes referred to below only as "particles" for short.

This object is achieved according to the invention by a paint mist separator device, sometimes referred to as "device" for short, having the features of claim 1. Such a device is intended for attachment externally in front of, or externally in front of and externally to, a filter module and/or separator module which itself functions as a paint mist separator, often referred to below in summary form as a filter module for short, for example a filter module according to EP 2 532 409 B.

The device is also configured for use with and attachment externally in front of, or externally in front of and externally to, such a filter module. For such an attachment, the device includes appropriate means, for example flaps, which may be inserted into an inflow opening of the filter module or into a gap between the filter module and a housing that encloses the filter module, and which for attachment of the device are externally inserted there at the filter module.

With regard to the location of the attachment of the device according to the invention (paint mist separator device), an attachment is provided either externally in front of and externally to a particular filter module ("externally in front of and externally to," or "externally in front of and to" or "externally to and in front of" for short), or alternatively, externally in front of ("externally in front of") a particular filter module.

In any case, an attachment in a flow path of a raw gas stream, which results during intended use of the filter module and/or separator module (a raw gas stream that results during intended use of the filter module and/or separator module), through the filter module and/or separator module is provided. This means that the device is situated in a flow path that passes through the filter module, and in the direction of this flow path is situated in front of the filter module, i.e., upstream from the filter module. Another option for determining the location of the attachment "externally in front of the filter module" or "externally to the filter module" refers to a so-called sealing plane of the filter module. A filter module is typically sealed off on the side facing the raw gas stream (front side; side face having the inflow opening) with respect to the particular faces adjoining on the edge, for example a housing. For the sealing, for example adhesive bonding to the faces adjoining on the edge is suitable. The particular seal together with the front side of the filter module defines the sealing plane. A pre-separator placed in front of the filter module is situated in front of the sealing plane (upstream from the sealing plane).

An attachment externally in front of a particular filter module means an attachment for which the device is in direct or at least indirect contact with the filter module.

An attachment externally to a filter module and in front of the filter module means that due to the attachment, the device attached to the filter module ("externally to") is in direct contact with the filter module, but is situated entirely or at least essentially outside of the filter module, but in any case, as described above, in front of the filter module ("externally in front of").

Thus, in both attachment situations the paint mist separator device is intended for attachment externally in front of a particular filter module, and in the attached state is situated externally in front of the filter module. The attachment or attachment option externally to a particular filter module always implies an attachment/attachment option in front of the particular filter module, and accordingly, in the following discussion it is sometimes not mentioned in every case that the paint mist separator device is then also situated in front of the filter module in the sense described above, or is intended for such a position. This is always to be construed.

For an attachment externally to or at least externally in front of a particular filter module, the device according to the invention (paint mist separator device) first comes into contact with a raw gas stream that is flowing against the particular filter module. In relation to the filter module situated behind (downstream from) the device in the flow direction of the raw gas stream, the device according to the invention thus functions as an input-side or upstream separation stage, and accordingly is often also referred to below as a pre-separator. In the following discussion, the terms "device," "paint mist separator device," and "pre-separator" thus refer to the same thing, and when any one of these terms is used, the other terms or the expression "paint mist separator device for attachment to or at least in front of a filter module" is always to be construed. The paint mist separator device may also be referred to as an impact separator, and functions as an impact separator.

The device (the pre-separator) has at least one central face as well as side faces laterally adjoining the central face in each case, and the device (the pre-separator) is attachable, in particular removably attachable, externally to (to and in front of) or externally in front of the particular filter module, via the ends of the side faces. For use of the device (the pre-separator) together with a particular filter module, the device (the pre-separator) is attached externally to (at and in front of) the filter module, but in any case in front of the filter module.

During operation, a portion of the particles entrained in the raw gas stream already deposit at the pre-separator, so that the pre-separation function is ensured. In the flow direction adjoining the pre-separator, the incident raw gas stream, as previously, passes through an inflow opening in the particular filter module and into the interior of the filter module, and in the process sweeps at least over at least one edge of the central face of the pre-separator (or at least one edge of the central face and in each case at least one edge of the side faces of the pre-separator). This results, at least in part, in a deflection, in particular a multiple deflection, of the raw gas stream, and from a previously (prior to the pre-separator) possibly laminar or at least essentially laminar flow, at least locally (in the area of the edge/edges of the pre-separator) becomes turbulent flow with swirling. Such swirling facilitates the deposition in the area of the turbulence formation, and thus in the area of the pre-separator.

The advantage of the proposed device is that, due to its arrangement/placeability in any case in front of a filter module, a portion of the particles entrained in the raw gas stream are already deposited at the device (function as a pre-separator). This increases the so-called service life of the filter module which follows downstream, which otherwise possibly functions as a single deposition device. When or by the fact that the proposed device can be removed from the particular filter module as soon as the device is loaded to a certain extent with deposited particles, the particular filter module may subsequently be further used either by itself or with a new device. In the state of attachment to or at least in front of the particular filter module, the central face is preferably oriented transversely or at least essentially transversely with respect to the incident raw gas stream, and the raw gas stream strikes the front of the central face of the pre-separator (impact surface; function of the pre-separator as an impact separator). The side faces adjoining the central face allow the attachment at least in front of the particular filter module, and in some cases also the attachment in front of and to the particular filter module.

In the patent authority's search regarding the priority-establishing German Utility Patent application (DE 20 2021 102 947.1), DE 10 2009 022 459 A1 and CN 209 985 061 U1 were identified as prior art.

A pre-separator for the intake opening or suction opening of spray mist suction units is known from DE 10 2009 022 459 A1. The pre-separator involves two levels with half-pipe-shaped baffle segments, the respective half-pipes facing one another with their open sides. Thus, the known pre-separator has no central face, but instead has a plurality of baffle segments, and consequently has no side faces adjoining a central face, and is also not provided for attachment to a filter module and/or separator module by means of such side faces.

A configuration is known from CN 209 985 061 U1, whose components in the broadest sense may be regarded as a filter module and/or separator module and as a paint mist separator device within the meaning of the description presented herein. However, the paint mist separator device in the cited document is not attachable to the filter module and/or separator module provided therein, and in particular the paint mist separator device therein has no side faces adjoining a central face by means of which an attachment to a filter module and/or separator module could take place.

Advantageous embodiments of the invention are the subject matter of the subclaims. Back-references that are used within the claims refer to the further development of the subject matter of the referenced claim via the features of the respective dependent claim. They are not to be construed as a waiver of the attainment of independent subject matter protection for the features or feature combinations of a dependent claim. Furthermore, with regard to an interpretation of the claims and of the description, in the event of a more precise specification of a feature in a dependent claim, it is to be assumed that there is no such limitation in the respective preceding claims or in a more general embodiment of the device according to the invention. Accordingly, any reference in the description to aspects of dependent claims is expressly to be construed, without specific reference, as a description of optional features.

In one preferred embodiment of the pre-separator, it is provided that the pre-separator has flaps at the free end of each side face, or that the side faces run out into such flaps, i.e., the end-position section of the particular side face forms the flap. With regard to these flaps, it is provided that they function as the above-mentioned means for the removable attachment externally in front of or to a filter module.

For a pre-separator that is intended for attachment externally in front of and externally to a filter module, these flaps function as means for the removable attachment externally to and externally in front of the particular filter module. The pre-separator is attachable externally to and externally in front of the particular filter module, for example via engagement of the stated means, namely, the flaps, with an inflow opening in the particular filter module. For a pre-separator that is intended for attachment externally in front of a filter module, these flaps function as means for the removable attachment externally in front of the particular filter module. The pre-separator is, for example, removably attachable in front of ("externally in front of") the particular filter module by inserting the flaps into a gap that remains between the filter module and a housing that encloses the filter module. In a further, non-exhaustive mention of alternative attachment options, the pre-separator is removably attachable in front of ("externally in front of") the particular filter module, in that the flaps are laterally and externally attachable to a housing that encloses the filter module.

In one advantageous embodiment of the pre-separator, the flaps are hook-shaped. For an attachment externally to and externally in front of a filter module, such flaps allow, for example, suspension in the inflow opening of the filter module, with the hook-shaped flaps gripping around the inflow opening, over or behind a portion of the edge. For an attachment externally in front of a filter module, such hook-shaped flaps allow, for example, suspension of the pre-separator on pegs or the like provided for this purpose or in the gap between the filter module and the surrounding housing, or external suspension of the pre-separator on pegs or the like provided for this purpose at a housing that encloses the filter module.

In one preferred embodiment of the pre-separator, it is provided that the pre-separator is designed in one piece, and bending points within the overall surface of the pre-separator form front-side edges of the pre-separator as well as a boundary between the central face and each of the side faces. It is particularly preferably provided that the pre-separator has perforations for this purpose which facilitate bending during intended use and determine the location of the bending points with an accurate fit. For example, cardboard, pasteboard (in particular fiberboard or corrugated cardboard), plastic, metal, or the like are suitable materials for the pre-separator.

In one advantageous embodiment of the one-piece or possibly also multi-piece pre-separator, the side faces have a triangular or at least essentially triangular shape. For a shell contour of the pre-separator, the overall result is the geometric shape of a straight prism with a triangular or essentially triangular base area (the side faces of the pre-separator are the base areas of the geometric shape of the prism), i.e., a shape of the front side of a trash bin, for example. In any case, such a shape in the region of the edges of the side faces facing away from the vertices of the triangular or essentially triangular side faces results in an inflow area that is delimited by these edges (and also by the upper edge of the central face and the front side of the particular filter module). On the opposite side, i.e., in the region of the vertices or the shortest edges of the triangular or essentially triangular side faces, a lower edge of the central face at that location adjoins the front side of the particular filter module (and in one optional special embodiment described in greater detail below, even extends into the filter module via a flap adjoining the central face) or at least essentially adjoins this front side. In the attached state, a pre-separator having such triangular or at least essentially triangular side faces is oriented, for example, in such a way that the vertices of the side faces or the shortest edges of the side faces point downwardly, i.e., in the direction of gravity, wherein an orientation exactly the other way around (i.e., rotated by 180°) or also a rotation by 90° or 270° is possible.

Rectangular or at least essentially rectangular side faces are also a suitable alternative to triangular or at least essentially triangular side faces. The upwardly pointing edges of the side faces and the upwardly pointing edge of the central face then form an upper edge of the pre-separator, and the corresponding lower edges form a lower edge of the pre-separator, which together with the front side of the particular filter module delimit an upper or lower inflow area.

In a further preferred embodiment of the pre-separator, it is provided that its central face has a width, measured from one side face to the opposite side face, that corresponds or at least essentially corresponds to the width of an inflow opening in the particular filter module, and that the device (the pre-separator) is attachable to the particular filter module via engagement with this inflow opening, in particular via engagement of the flaps with this inflow opening. With such a width, i.e., a width corresponding to the width of the inflow opening in the particular filter module, the pre-separator covers the inflow opening, at least in this dimension.

In one preferred variant of this embodiment, it is also provided that a height of the central face (measured in the plane of the central face), measured transversely with respect to an axis of the central face (axis from one side face to the opposite side face) that determines the width is greater than the height of the inflow opening in the particular filter module. This height of the central face is optionally at least great enough that, for an orthogonal projection of the device (the pre-separator) onto the front side of the particular filter module with the inflow opening situated there, an upper edge of the central face coincides or essentially coincides at least with the upper edge of the inflow opening. The pre-separator then covers the inflow opening in two dimensions, i.e., in the two dimensions that determine the size of the inflow opening, and the function as a pre-separator is thus particularly well ensured. The height of the central face, measured transversely with respect to its width, may optionally be even greater than described above, so that for an orthogonal projection, the upper edge of the central face is situated above the upper edge of the inflow opening. On the one hand, this ensures complete coverage of the inflow opening by the pre-separator, and on the other hand results in even greater deflection of the incident raw gas stream and correspondingly intensified turbulence formation in the raw gas stream when it sweeps over the upper edge(s) of the pre-separator and flows into the filter module; such turbulence facilitates the deposition in the region of the turbulence formation, and thus in the region of the pre-separator.

For a particularly durable attachment of the pre-separator to a particular filter module, hook-shaped flaps are advantageously provided, at least on one side. Such a hooked shape results, for example, from a slot in each flap, wherein a flap that has a bending point adjoins a respective side face, in particular in the region of such a bending point.

In one advantageous embodiment, the faces over which incident flow passes when the device is used as a pre-separator, i.e., at least the central face and also the side faces, at least in part, may be structured, i.e., may have a surface that differs from a flat and/or closed surface. Such a structured surface increases the effective surface for the deposition. The structuring, for example, is in the form of holes in the central face and/or the side faces.

A further advantage of the device proposed here (the pre-separator) is that by use of the device (the pre-separator), turbulence of the raw gas stream occurs on the input side of the particular filter module, thus preventing centroid formation with regard to a location or region where the raw gas stream strikes the face of the filter module facing the incident raw gas stream.

The claims filed with the present patent application are proposed formulations without prejudice to the attainment of further patent protection. Since in particular the features of the dependent claims, with regard to the prior art on the date of priority, may form separate, independent inventions, the applicant reserves the right to make these or even further feature combinations, heretofore disclosed only in the description and/or drawings, the subject matter of independent claims or declarations of division. Moreover, the features of the dependent claims may also include separate inventions that are independent from the subject matter of the respective referenced claims.

The paint mist separator device proposed here (the pre-separator/the device proposed here) is intended for depositing particles entrained in an air stream (raw gas stream); in any case, it is not a device for separating, for example, material entrained in a liquid. The paint mist separator device causes deposition of the particles entrained in an air stream (raw gas stream) at at least one surface, and thus retains at least a portion of the particles entrained in the raw gas stream. This already achieves a considerable reduction of particles, entrained in a raw gas stream, on a so-called clean air side of the paint mist separator device (the clean air side is the downstream side, relative to the flow direction of the raw gas stream) compared to a quantity of particles on the upstream (raw gas, incident flow) side.

One exemplary embodiment of the invention is explained in greater detail below with reference to the drawings. Corresponding subject matter or elements is/are provided with the same reference numerals in all figures The exemplary embodiment is not to be construed as limiting to the invention. Rather, within the scope of the present disclosure, supplements and modifications are also possible, in particular those that are apparent to those skilled in the art with regard to achieving the object of the invention, for example by combining or modifying individual features or method steps that are described in the general or specific portion of the description and contained in the claims and/or the drawings, and that by use of combinable features result in new subject matter or new method steps or method step sequences within the scope of the claims.

DETAILED DESCRIPTION OF ILLUSTRATED EMBODIMENTS

Figure 1:
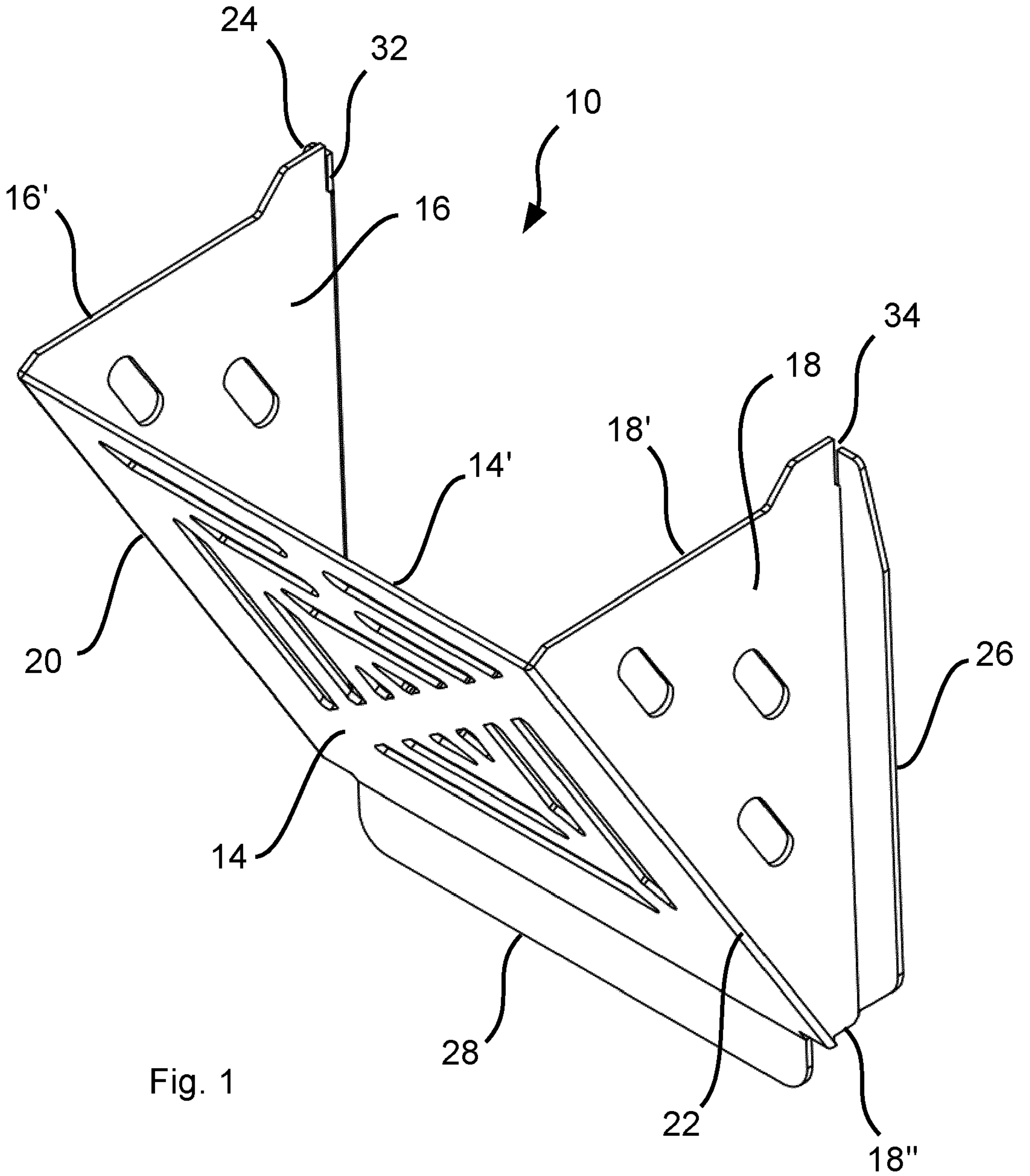
FIG. 1 shows a device ("pre-separator") for the removable external attachment to a filter module and/or separator module.
Figure 2:
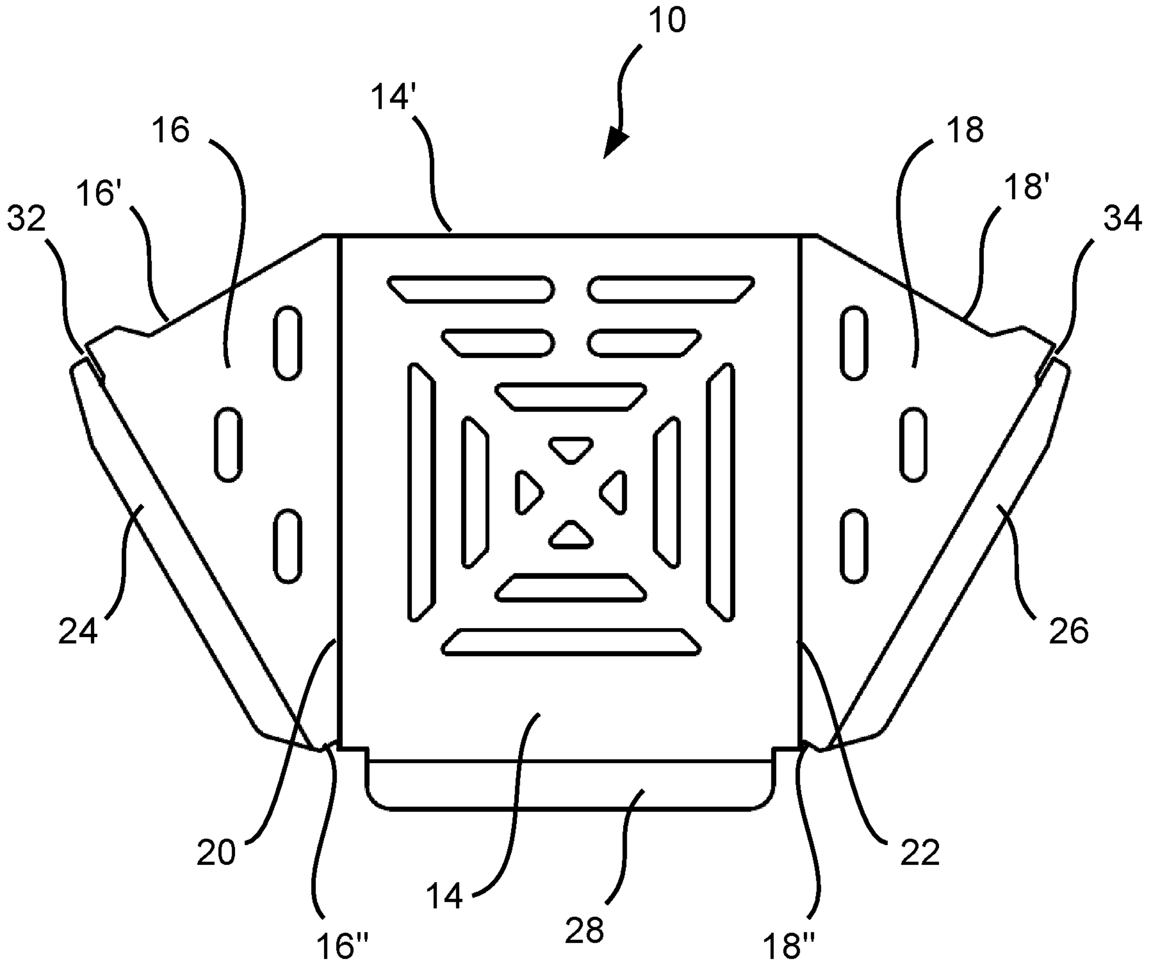
FIG. 2 shows the pre-separator according to FIG. 1 in the flat state.

The illustrations in FIGS. 1 and 2 show an example of one embodiment of a device 10, often referred to as a pre-separator 10 on account of its essential function, namely, on the one hand in an isometric view (FIG. 1), and on the other hand in a view in a flat form (FIG. 2) which comes into consideration for transport, for example. This device 10 (the pre-separator 10) is intended and configured for removable attachment externally to a filter module and/or separator module 12 (FIG. 3), often referred to in summary form as a filter module 12 for short.

To the extent that the present description uses relative terms such as "upper" and "lower," this refers to a typical use and installation situation of a particular filter module 12, namely, the orientation shown in the figures. The attachment of a pre-separator 10 externally to or in front of a particular filter module 12 may in principle also take place in an orientation of the particular filter module 12 that differs from the use and installation situation; the filter module 12 is then rotated in comparison to the use and installation situation. For such a rotated orientation, the meaning of such relative terms as well as the meaning of further terms that reference such terms, such as "lateral," also corresponding change. This is always to be construed for the entire description presented here.

The device 10 functions as a turbulence and deposition device (pre-separator 10) upstream from the filter module 12 on the input side (in relation to an incident raw gas stream S that is passed through the filter module (FIG. 3)). For a pre-separator 10 attached externally to the filter module 12, and also for a pre-separator 10 attached externally in front of the filter module 12, the raw gas stream S, for example an air stream that is loaded with paint mist (overspray) or the like, and which typically entrains particles, in particular particles in the form of paint and/or lacquer particles, initially strikes the pre-separator 10, and only afterwards, the filter module 12. At the pre-separator 10, this already brings about a first deposition of particles entrained in the raw gas stream S. As a result of a first deposition of particles already taking place at the pre-separator 10, these particles do not need to be deposited in or at the filter module 12. This increases a so-called service life of the filter module 12. The pre-separator 10 may always be exchanged and replaced with a new pre-separator 10 when this is necessary due to the quantity of particles deposited at the pre-separator 10. Replacing the filter module 12 is required only when this is necessary due to the quantity of particles taken in by the filter module. In that case, further pre-separators 10 with such a new filter module 12 may be used one after the other, and so forth.

The pre-separator 10 includes at least one central face 14 as well as side faces 16, 18 laterally adjoining the central face 14. By means of these side faces 16, 18, in particular by means of the ends of these side faces 16, 18, this embodiment of the pre-separator 10 is externally attachable to the particular filter module 12 (filter module and/or separator module 12), and for use with such a filter module 12 is externally attached to same, and for use of the filter module 12 together with the pre-separator 10 is externally attached to the particular filter module 12, as shown by way of example in the illustration in FIG. 3.

The pre-separator 10 as shown in the embodiment is advantageously designed in one piece and is made, for example, of cardboard, pasteboard (in particular fiberboard or corrugated cardboard), plastic, metal, or the like. As likewise shown in the embodiment, it is advantageous that at least the central face 14 is a flat section of the pre-separator 10, the term "flat" meaning that the central face 14 (apart from a thickness that is determined by a particular material thickness) extends essentially only in two dimensions. In the embodiment shown, this also applies for the side faces 16, 18.

At the transition from the central face 14 to each side face 16, 18, for a one-piece pre-separator 10 bending points are present, in particular perforated bending points, referred to below as front-side edges 20, 22. In addition to the surface of the central face 14 and the surfaces of the side faces 16, 18, the bending points determine the basic shape of the pre-separator 10, and form a boundary between the central face 14 and each side face 16, 18.

As shown in the illustrated embodiment, but in principle optionally, the side faces 16, 18 advantageously have a triangular or at least essentially triangular shape. For an essentially triangular shape (also shown in the exemplary embodiment), an actual vertex is absent. In any case, each side face 16, 18 has a side, to be regarded as the base of the triangular or at least essentially triangular shape, and further sides that are to be regarded as legs of the triangular or at least essentially triangular shape that adjoin this base. One of these legs is the boundary between the central face 14 and the side face 16, 18. The other leg is the boundary line for a flap 24, 26 that adjoins the side face 16, 18 and functions as a module engagement section. For each side face 16, 18, at least for an essentially triangular shape, one edge extending from the boundary (front-side edge 20, 22) with the central face 14 is longer than the other edge of the same side face 16, 18, extending from this same boundary. For differentiation, this longer edge is referred to below as the upper edge 16', 18' (upper edge 16', 18' of the side face 16, 18), and this shorter edge is correspondingly referred to below as the lower edge 16," 18" (lower edge 16," 18" of the side face 16, 18); in the illustration in FIG. 1, the lower edge 16" of the side face 16 in the background is concealed (see FIG. 2). The length of the lower edge 16," 18" may be so short that it no longer represents an actual edge. In that case the side face 16, 18 is no longer essentially triangular, but, rather, genuinely triangular. With the designation of two edges of the side faces 16, 18 as upper and lower edges 16', 18', 16," 18", it is also possible to correspondingly designate the edges of the central face 14. An upper edge 14' of the central face 14 is thus an edge of this central face 14 that adjoins the upper edges 16', 18' of the side faces 16, 18. The edge of the central face 14 opposite from the upper edge 14' is correspondingly the lower edge thereof.

The upper edge 14' of the central face 14 and the upper edges 16', 18' of the two side faces 16, 18 together form an upper edge or the upper edges of the pre-separator 10, and in the state attached to a filter module 12, together with the filter module 12, namely, a front side of the filter module 12 (front side in relation to an incident flow direction during operation), delimit an inflow area E (FIG. 3), namely, an inflow area E in the area that is delimited by the central face 14 and the two side faces 16, 18 of the pre-separator 10 and the front side of the filter module 12. The raw gas stream S flows across the inflow area E (or at least essentially across the inflow area E) and into the area thus delimited, and from there flows via an inflow opening 30 in the front side of the filter module 12 into the interior of the filter module 12 (in the illustration in FIG. 3, due to the inflow opening 30, the filter medium and/or deposition medium placed inside the filter module 12 is visible in the area of the inflow opening 30, and is a layered paper filter, for example (see EP 2 532 409 B)).

In the embodiment shown, at one end of each side face 16, 18, referred to as a free end, and/or at the lower edge of the central face 14, the pre-separator 10 in each case has flaps 24, 26, 28 (a flap 24 is partially concealed in the illustration in FIG. 1; see FIG. 2) that are connected (in particular in one piece) to the respective side face 16, 18 or to the central face 14 and that function as module engagement sections. The ends in question of the side faces 16, 18 are free ends since they do not adjoin the central face 14 from which the side faces 16, 18 themselves extend.

These flaps 24, 26, 28 are intended for the removable external attachment to the particular filter module 12, and thus, for the removable attachment of the pre-separator 10 as a whole to the particular filter module 12. For a one-piece pre-separator 10, a boundary line in the form of an (optionally perforated) bending point exists between a flap 24, 26, 28 in each case and the respective side face 16, 18 or the central face 14. By means of these flaps 24, 26, 28, the pre-separator 10 is attached to or in, in particular inserted into, a recess or recesses intended for this purpose in the particular filter module 12. In the process, the flaps 24, 26, 28 engage, at least in part, with the filter module 12; the flaps 24, 26, 28 thus function as module engagement sections. This does not change the external attachment of the pre-separator 10 to the filter module 12, since the attachment takes place from the outside, and the faces that act for the pre-separation are situated outside the filter module 12.

A filter module as known from EP 2 532 409 B may be considered as a filter module 12, and with this citation the entire disclosed content is intended to be incorporated by reference into the present description. On its front or input side this filter module 12 has an opening, referred to as an inflow opening in EP 2 532 409 B, for the incident raw gas stream. The inflow opening 30 is shown in the illustration in FIG. 3. Other filter modules likewise have a corresponding opening as an inflow opening on a front or input side thereof.

Figure 3:
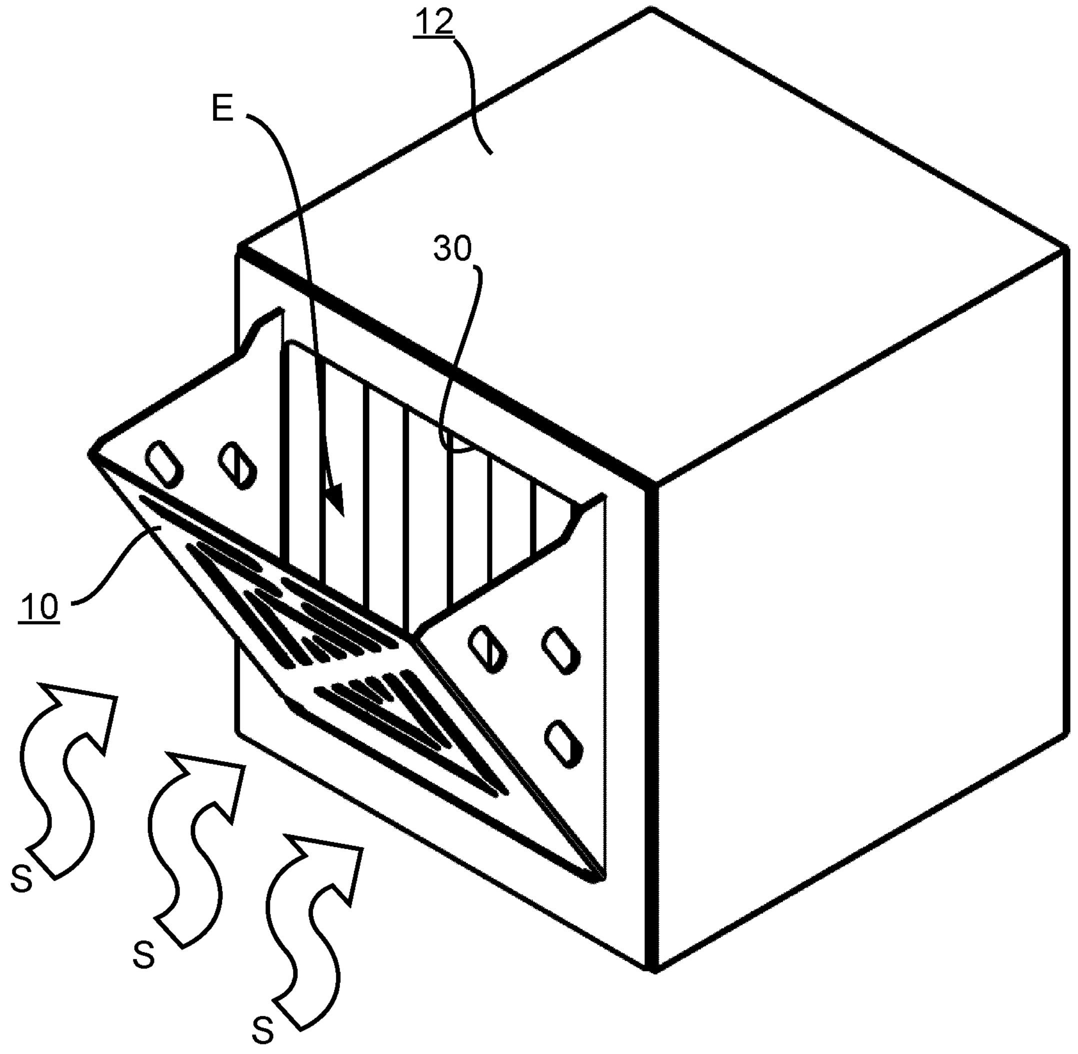
FIG. 3 shows the pre-separator according to FIGS. 1 and 2 in a state attached to a filter module and/or separator module.

The illustration in FIG. 3 schematically shows a simplified view of a filter module 12 according to EP 2 532 409 B, and a border line from the inflow opening 30 of the filter module is denoted by the corresponding reference numeral in the illustration in FIG. 2. The illustration of the filter module 12 as a depiction of the filter module 12 according to EP 2 532 409 B is strictly an example, and the pre-separator 10 is intended and suited for use with basically any filter modules 12. In the interest of better clarity in the illustration, the reference numerals of the individual elements of the pre-separator 10 have been omitted in FIG. 3. In this regard, reference is made to the illustrations in FIGS. 1 and 2.

The attachment of the pre-separator 10 for use with a particular filter module 12, for example a filter module 12 according to EP 2 532 409 B, preferably takes place at and/or in the particular inflow opening 30 thereof. Thus, the inflow opening 30 is an example of the above-mentioned recess in the particular filter module 12, which is intended for the attachment of the pre-separator 10. The attachment to and/or in the particular inflow opening 30 takes place, for example, by guiding the flaps 24, 26, 28 from the outside, through the inflow opening 30 and into the interior of the filter module 12, and inserting them inside the filter module 12, on the rear side of the wall surfaces delimiting the inflow opening 30, and/or folding them over on the rear side of the wall surfaces of the filter module 12 delimiting the inflow opening 30. Such insertion is suitable, for example, for the flap 28 adjoining the lower edge of the central face 14, and such folding over is suitable, for example, for the flaps 24, 26 adjoining the free ends of the side faces 16, 18.

In one special embodiment of the pre-separator 10, it is provided that the flaps 24, 26 adjoining the free ends of the side faces 16, 18 are hook-shaped in the broadest sense, for example in that the pre-separator 10 has slots 32, 34 in the region of the boundary line, between a side face 16, 18 and the respective adjoining flap 24, 26 (an edge contour that borders the slots 32, 34 represents a hook in the broadest sense.) These slots 32, 34 start from the upper edge 16', 18' of the respective side face 16, 18 and extend along and in the direction of the above-mentioned boundary line, i.e., along the bending point between the side face 16, 18 and the adjoining flap 24, 26. The slots 32, 34 extend only over a comparatively short area of this boundary line, and in one specific embodiment the length of each slot 32, 34 is, for example, in a range of approximately one centimeter to approximately two centimeters, or in a range of approximately 1% to approximately 5% of the length of this boundary line.

It is preferably provided that a distance between a lower end of the slots 32, 34, i.e., a base of the slots 32, 34 in a manner of speaking, on the one hand and the lower edge of the central face 14 on the other hand corresponds or at least essentially corresponds to the height of the inflow opening 30 of the particular filter module 12. The extension of the inflow opening 30, measured in the vertical direction (i.e., in the direction of gravity) for a filter module 12 that is placed as intended, is regarded as the height of the inflow opening 30 (inflow opening 30 of the filter module 12). Based on such a position of the filter module 12, the edges of the inflow opening 30 may then be designated as the lower edge, lateral edges, and upper edge.

The attachment of a pre-separator 10 having such slots 32, 34 then takes place, for example, by initially inserting the flaps 24, 26 adjoining the side faces 16, 18 (with the flaps, for example, in an unbent state or at least initially not yet in a bent state, i.e., in an orientation in flush alignment with the particular side face 16, 18) into the inflow opening 30. Due to the at least slight overdimensioning of the pre-separator 10, it is held obliquely, and in the area of the slots 32, 34 at the upper edge of the inflow opening 30 is guided into the filter module 12. At that location the pre-separator 10 is pushed upwardly (opposite the direction of gravity), so that the wall sections of the filter module 12 adjoining the upper edge of the inflow opening 30 engage with the slots 32, 34. The pre-separator 10 is thus already attached to the filter module 12 on one side, namely, in the region of the upper edge of the inflow opening 30. The pre-separator 10 is now swiveled from the previous oblique orientation, and thereupon or beforehand the flap 28 adjoining the central face 14 is bent down so that it may be inserted through the inflow opening 30 and into the filter module 12. After this flap 28 is inserted into the inflow opening 30 and the flap 28 is appropriately bent down, the bending point relaxes, and the flap 28 rests on the inner side of the filter module 12, against the wall section of the filter module 12 adjoining the lower edge of the inflow opening 30, or rests at least partially against this wall section. The flaps 24, 26 adjoining the side faces 16, 18 are now also situated completely inside the filter module 12, and in the course of relaxation of the bending points at that location inside the filter module 12, the flaps fold over on the inner side of the wall sections of the filter module 12 laterally adjacent to the inflow opening 30, or are folded over in this form.

It is pointed out that for the operationally ready attachment of a pre-separator 10 to a filter module 12, it is not necessary for its all of the flaps 24, 26, 28 or some of the flaps 24, 26, 28 to rest with their full surface against the inner side of the wall sections of the filter module 12 laterally adjacent to the inflow opening 30. Rather, it is sufficient if, during relaxation of the particular bending points, an overall width and height of the pre-separator 10 results that is greater than the width and height of the inflow opening 30 in the filter module 12.

In addition to a flap 28 at the central face 14 or instead of such a flap 28, for essentially triangular side faces 16, 18 a hook-shaped (nose-shaped) design, not shown, of the short, lower edges 16," 18" of the side faces 16, 18 may be considered. In such an embodiment, after the corresponding wall sections of the filter module 12 engage with the slots 32, 34 thereof (with appropriately deep slots 32, 34), the pre-separator 10 is lifted high enough so that the hook (the nose) of the corresponding contour of the short edges 16," 18" of the side faces 16, 18 may be lifted over the lower edge of the inflow opening 30. The pre-separator 10 with this contour is then pushed onto the lower edge of the inflow opening 30 or released (or the pre-separator 10, due to its weight, automatically drops onto this edge, which then functions as a support surface). In the process, the hook (the nose) engages behind the inner side of the wall section of the filter module 12 adjoining the lower edge of the inflow opening 30, and as a result the pre-separator 10 in its lower area is then also attached to the inflow opening 30.

Figure 4:
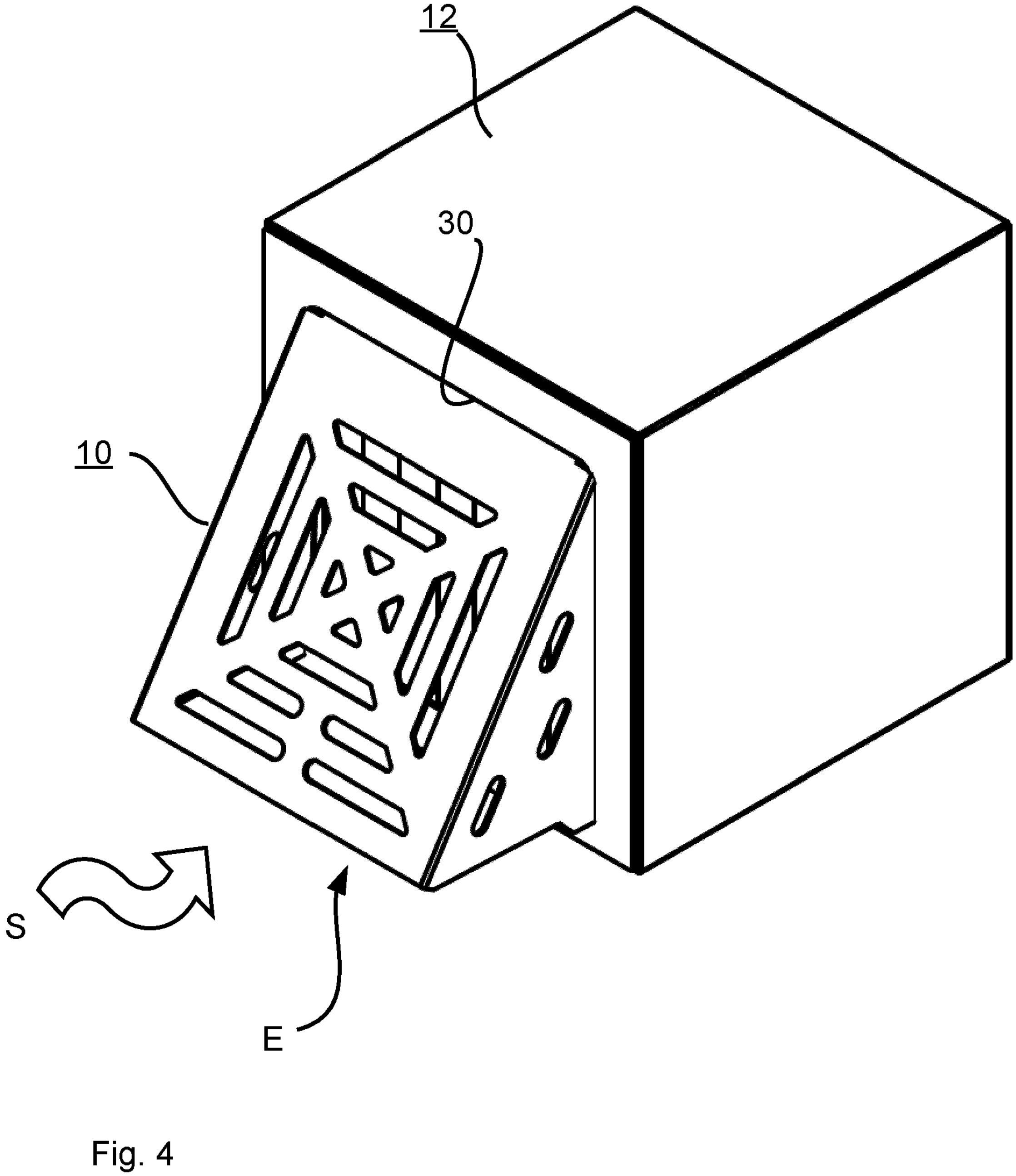
FIG. 4 shows a filter module and/or separator module as well as a pre-separator according to FIG. 3, with a pre-separator attached in a different orientation compared to FIG. 3.

The illustration in FIG. 4 shows a situation in which the pre-separator 10 is attached to the filter module 12 "the other way around," namely, the other way around compared to the situation according to FIG. 3. The inflow opening 30 in this case points downwardly. The attachment of the pre-separator 10 in such an orientation corresponds to the above-described attachment, with the difference that the pre-separator 10 with its slots 32, 34 is suspended on the lower edge of the inflow opening 30, and the flap 28 of the central face 14 is inserted in the region of the upper edge of the inflow opening 30.

The use of a pre-separator 10 as described here may be considered in different embodiments.

The embodiments differ, for example, in the length of the long edges 16', 18' of the side faces 16, 18. The longer these long edges 16', 18', the larger is the inflow area E. Pre-separators 10 having longer or shorter long edges 16', 18' may be selected depending on the particular application.

Figure 5:
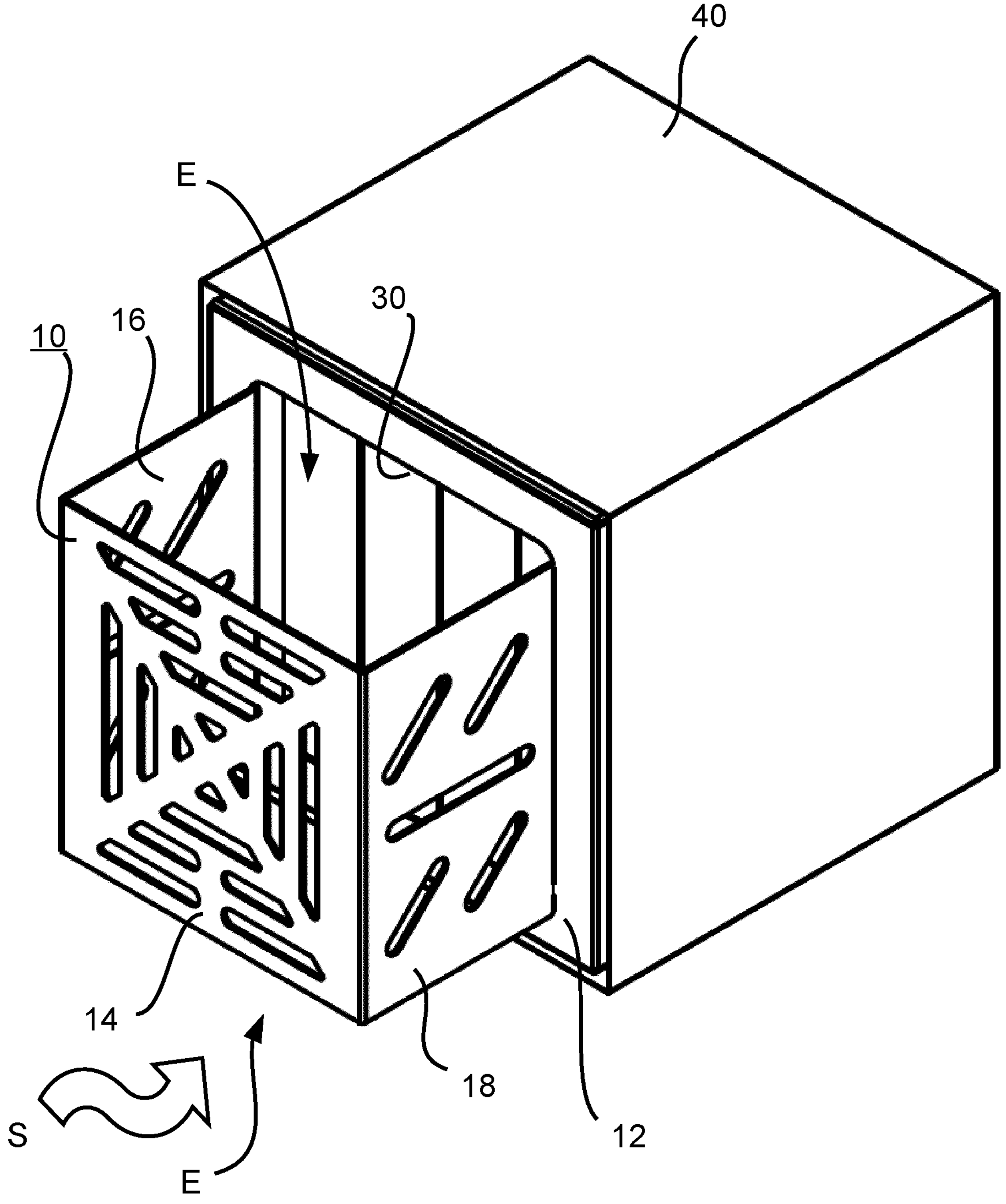
FIG. 5 shows a further embodiment of a pre-separator, the pre-separator being attached externally to a filter module and/or separator module.
Figure 6:
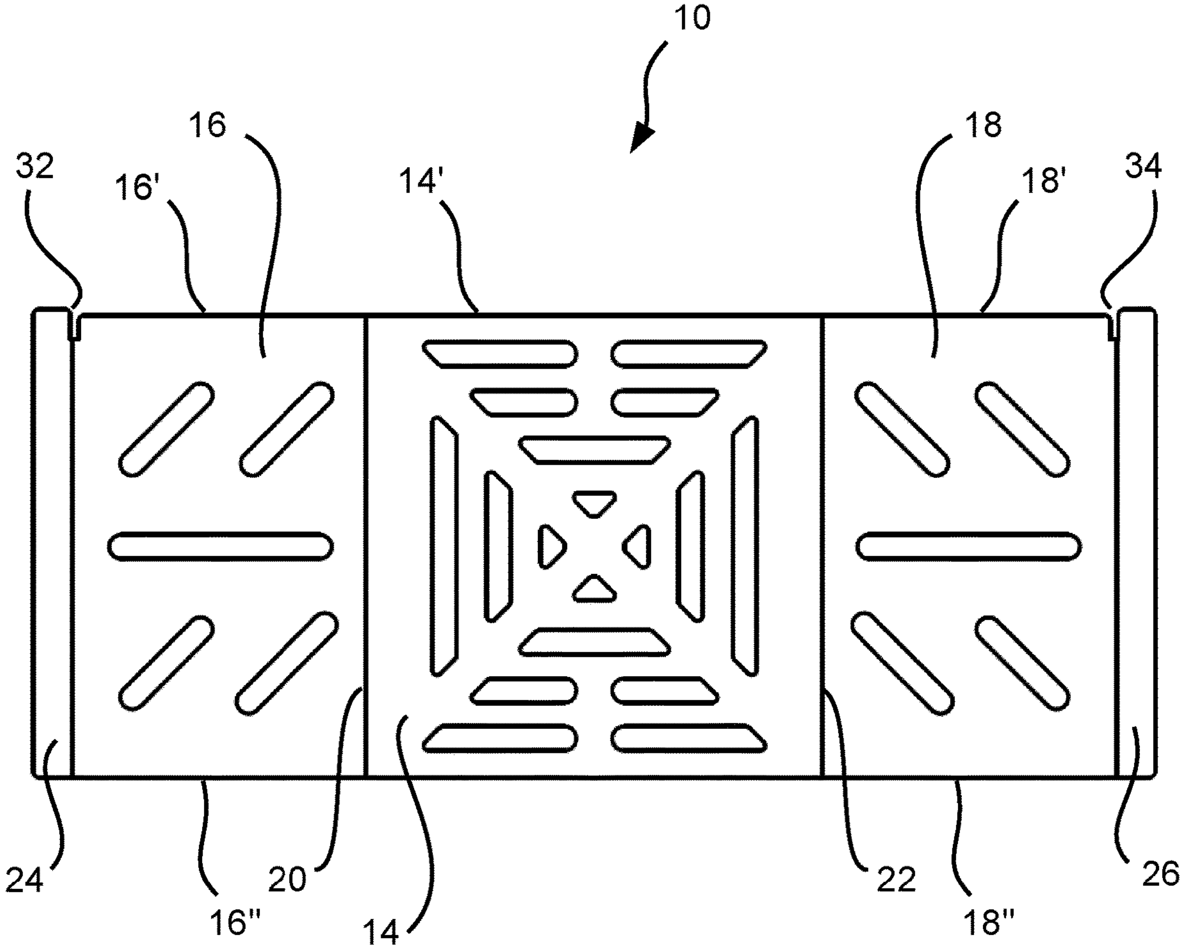
FIG. 6 shows the pre-separator according to FIG. 5 in a flat state.
Figure 7:
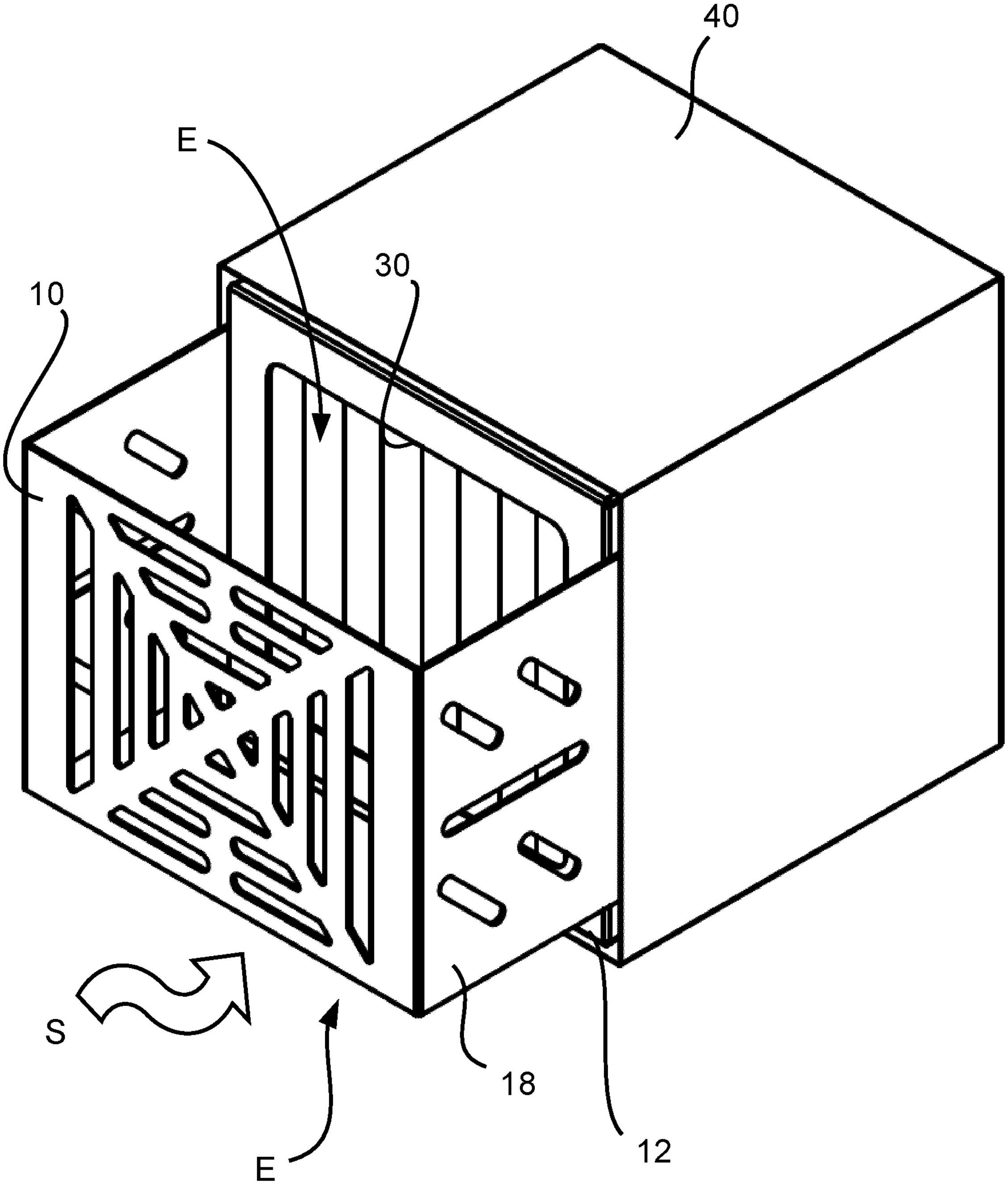
FIG. 7 shows a further embodiment of a pre-separator, the pre-separator being attached externally in front of a filter module and/or separator module.
Figure 8:
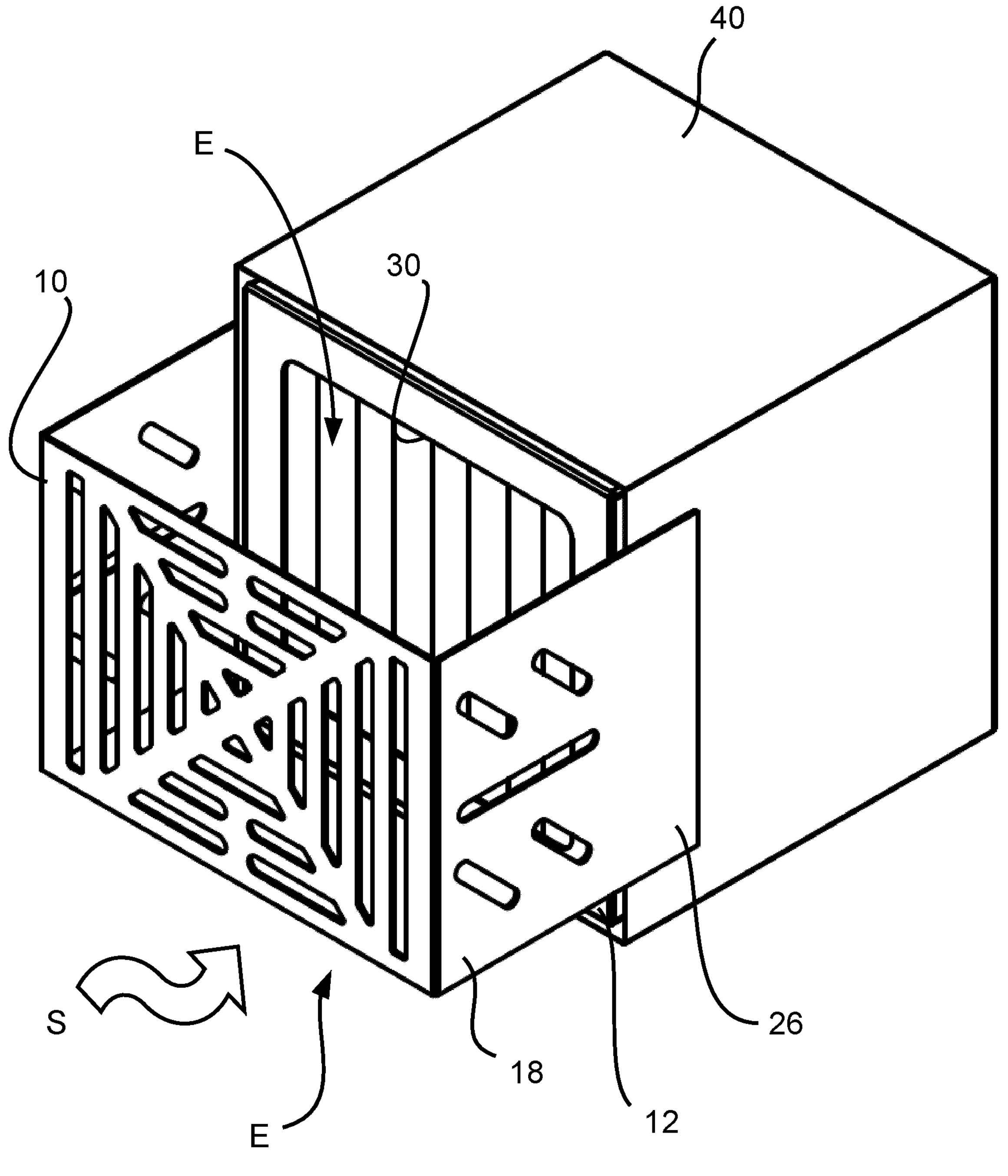
FIG. 8 shows yet a further embodiment of a pre-separator, the pre-separator being attached externally in front of a filter module and/or separator module.
Figure 9:
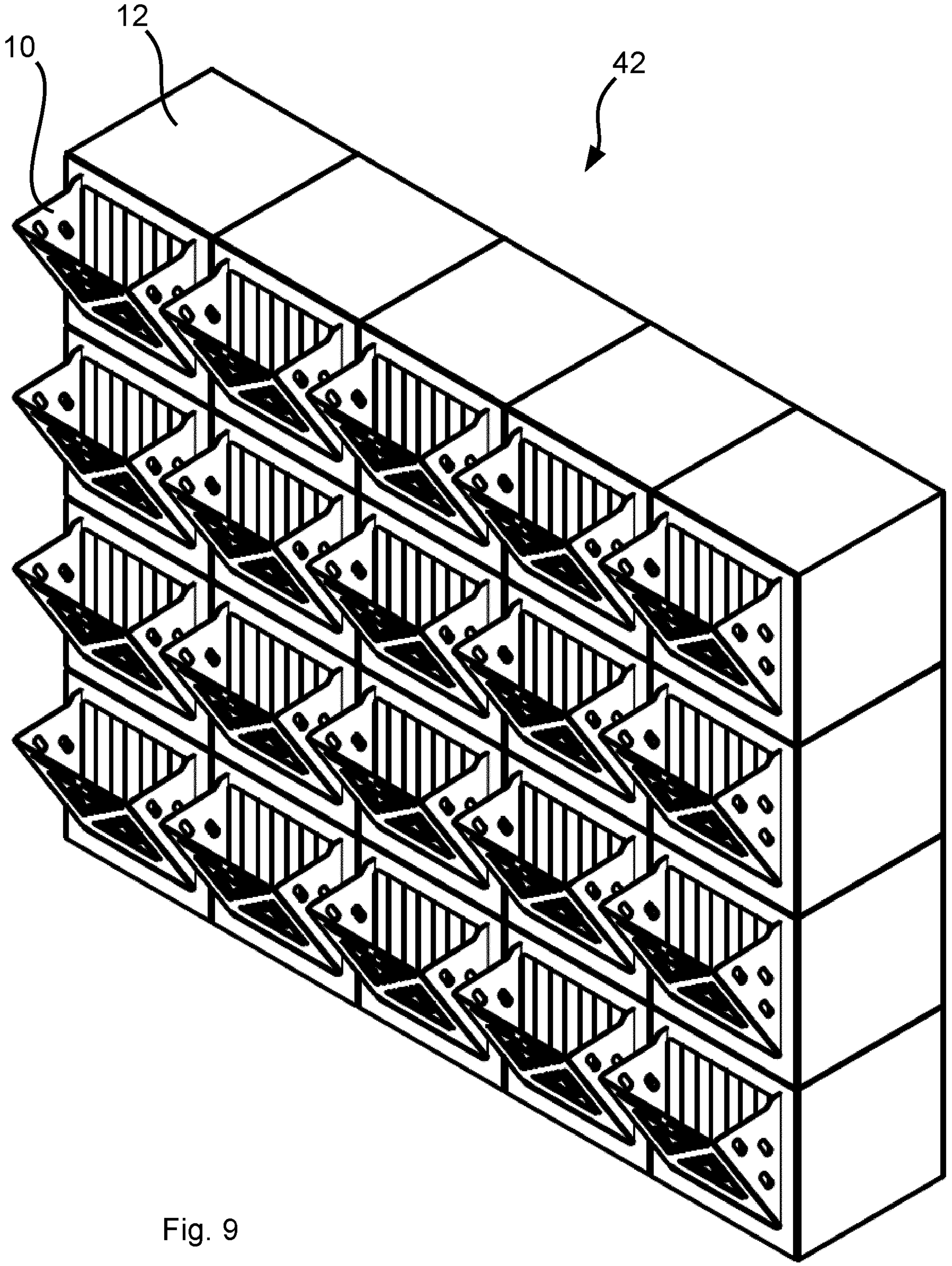
FIG. 9 and FIG. 10 show a filter module wall with filter modules and/or separator modules, each provided with a pre-separator.
Figure 10:
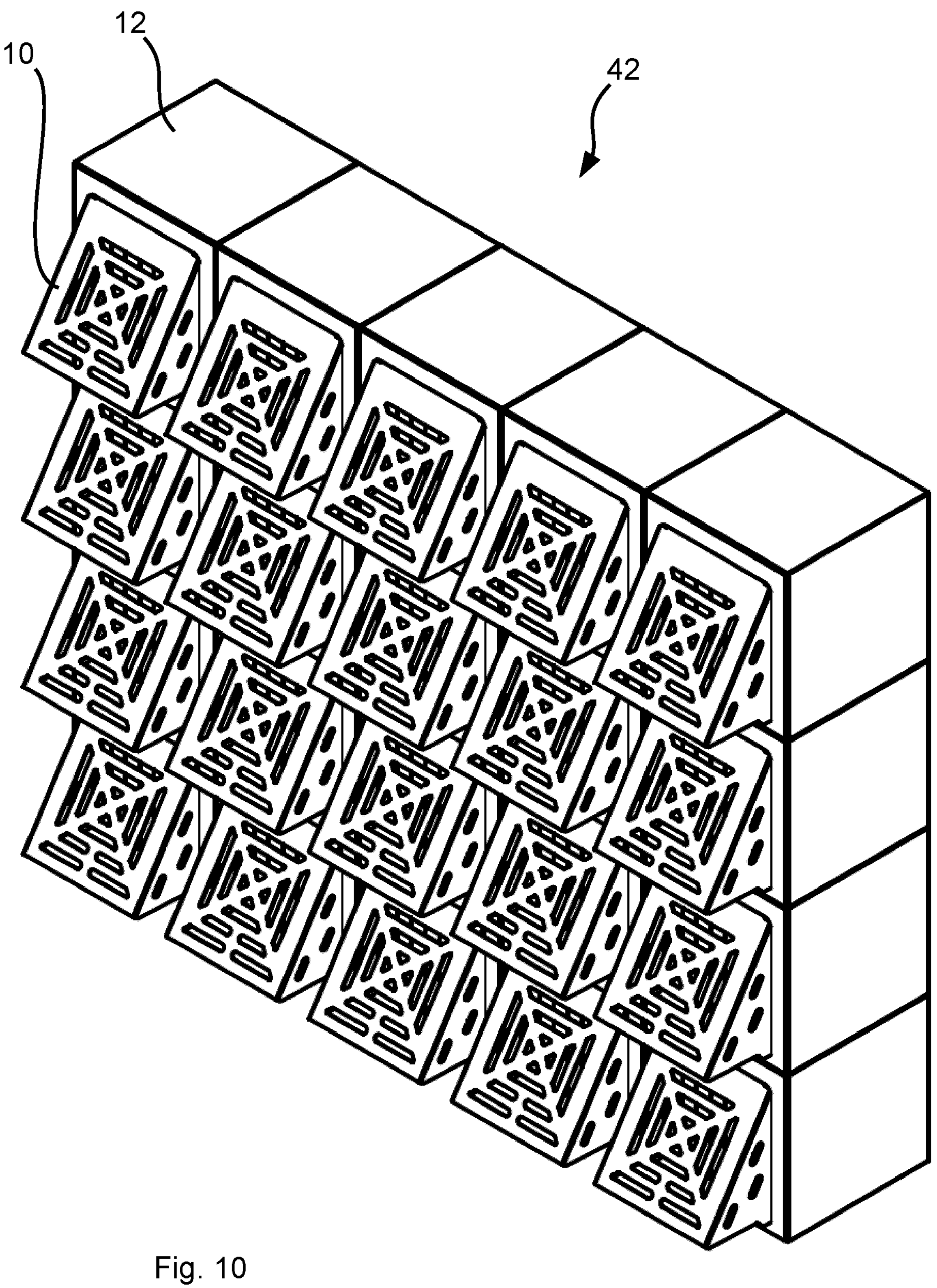

The illustrations in FIGS. 5, 6, 7, and 8 each show a different embodiment of a pre-separator 10 in comparison to the previous figures, namely, a pre-separator 10 having rectangular side faces 16, 18 and in different attachment positions (FIGS. 5, 7, and 8). The filter module 12 in each case is placed in a housing 40 that accommodates the filter module 12 and is open on two sides (the housing 40 which is open on two sides may also be referred to as a frame or enclosure, and is open at opposite sides, so that an air stream passing through the filter module 12 can also flow through the housing 40). The option of placing the filter module 12 in a housing 40 also applies for the situation shown in FIGS. 3 and 4. The housing 40 does not have to be an individual housing 40, as schematically shown for simplification. A compartment in a shelf-like device (filter module wall 42; FIGS. 9, 10) with multiple compartments for one filter module 12 each, placed next to and/or on top of one another, may also function as a housing 40.

The illustration in FIG. 6 shows the pre-separator 10 from FIG. 5 in a view in a flat form. The pre-separator 10 with rectangular side faces 16, 18, except for this shape of the side faces 16, 18 and the lack of a flap 28 at the central face 14, corresponds to the pre-separator 10 described above, so that reference is made to the previous description, in particular the description for FIGS. 1 and 2, to avoid unnecessary repetitions. For such a pre-separator 10, as indicated in the illustration in FIG. 5, this results in a lower and an upper inflow area E (this also applies for the attachment situations shown in FIGS. 7 and 8).

The difference between the attachment situations in FIGS. 5, 7, and 8 lies in the type of external attachment of the pre-separator 10 to the filter module 12 (FIG. 5) and the external attachment in front of the filter module 12 (FIGS. 7 and 8). In the situation shown in FIG. 5, the pre-separator 10 is inserted into the inflow opening 30 of the filter module 12. This corresponds to the situation shown in FIG. 3 (external attachment to the filter module 12), so that reference is made to the description for FIG. 3 to avoid unnecessary repetitions.

In the situation shown in FIG. 7, the pre-separator 10 with the ends of its side faces 16, 18 is inserted into a space (gap) remaining between the filter module 12 and the housing 40 accommodating the filter module 12, and these ends are wedged in, for example. In comparison to an external attachment to the filter module (FIGS. 3, 4, 5), this is referred to as an attachment of the pre-separator 10 externally in front of the filter module 12. In the situation shown in FIG. 8, the pre-separator 10 with the ends of its side faces 16, 18 is externally attached, for example adhesively bonded, in particular removably adhesively bonded, to the housing 40 accommodating the filter module 12. This is also a situation that is referred to as an attachment of the pre-separator 10 externally in front of the filter module 12. For both situations (FIGS. 7, 8), it does not matter whether the pre-separator 10 is in contact with the filter module 12; in particular for an attachment as in FIG. 8, the pre-separator 10 in any case is attached over the filter module 12, not to it, so that the pre-separator 10 is situated in front of the filter module 12, namely, externally in front of the filter module 12, in the flow direction of a raw gas stream S.

To this end and in general, it is noted that the specification "externally in front of" is more general than the specification "externally to." In addition, a pre-separator 10 that is externally attached to the filter module 12 is situated externally in front of the filter module 12, and "externally in front of" means that the faces or face sections of the pre-separator 10 that act for the paint mist separation are situated in front of the filter module 12, thus, in front of a plane that is defined by its side faces together with the inflow opening 30. Thus, the specification "externally in front of" does not mean that all segments or face sections of the pre-separator 10 are situated in front of this plane. In any case, however, the specification "externally in front of" means that the central face 14 of the pre-separator 10 is situated in front of this plane. Furthermore, the specification "externally in front of" means that the side faces 16, 18, or in any case essential sections of the side faces 16, 18, are situated in front of this plane.

The embodiments of the pre-separator 10 shown in the illustrations in FIGS. 7 and 8 do not require flaps 24, 26 that are set apart from the side faces 16, 18 by a bending point in each case. Rather, the side faces 16, 18 merge into these flaps 24, 26, and the ends of the side faces 16, 18 (the distal regions of the side faces 16, 18, relative to the central face 14) are the flaps 24, 26. The flaps are inserted into the gap between the filter module 12 and the housing 40 (FIG. 7) or are externally attached to the housing 40.

As shown in the figures in the embodiment of the pre-separator 10, illustrated there by way of example, in one advantageous but basically optional embodiment of the pre-separator 10 the central face 14 and/or one or each side face 16, 18 are/is structured.

In the illustrated embodiment, the structuring is in the form of holes, in particular elongated holes (punch-outs), distributed over the particular surface. At least a portion of the incident raw gas stream S may flow in through such holes, and additional deposition of particles entrained in the raw gas stream S takes place at the edges of the holes.

The illustrations in FIGS. 9 and 10 show a plurality of filter modules 12 situated next to and on top of one another, each with a pre-separator 10 that is externally attached to the filter module 12 (only one of which is denoted by reference numerals in each case). This plurality of filter modules 12 forms a filter module wall 42. To obtain such a filter module wall 42, the filter modules 12 (or filter modules 12, each with a surrounding housing 40, as shown in FIGS. 5, 7, and 8, for example) are placed next to and on top of one another. The filter modules 12 may also each be situated in their own housing 40 (likewise, see the illustrations in FIGS. 5, 7, and 8), and a shelf-like structure with compartments situated next to and on top of one another, each of which functions as a housing 40 for exactly one filter module 12, forms a base of the filter module wall 42, namely, a base in the form of a support structure that is open on both sides, with equally sized compartments that are uniformly spaced apart in the horizontal and vertical directions.

All embodiments described herein are suitable as pre-separators 10. Likewise, all attachment options described herein, in each case with a pre-separator 10 attached externally to or externally in front of each filter module 12, come into consideration. The illustrations in FIGS. 9 and 10 based on the embodiments shown in FIG. 3 or 4 are expressly only examples. Lastly, filter module walls 42 (at least one filter module wall 42) having a mixed configuration, i.e., having different pre-separators 10 (all embodiments described herein) and/or having different types of attachments/orientations (likewise all embodiments described herein), come into consideration.

The dimensions of a filter module wall 42 (number of rows with adjacently placed filter modules 12, with or without a surrounding housing 40; number of such rows situated one on top of the other) is basically arbitrary, and also in this regard the illustrations in FIGS. 9 and 10 are expressly only examples.

Although the proposed invention has been illustrated and described in detail with reference to the exemplary embodiment, the invention is not limited to the disclosed example(s), and other variations may be derived therefrom by those skilled in the art without departing from the scope of protection of the invention. For example, variants come into consideration in which a pre-separator is suspended in front of the filter module, or a pre-separator is attached in front of the filter module and to the end of at least one rod protruding from the filter module.

Individual key aspects of the description filed here may thus be briefly summarized as follows: A device 10 for in particular removable external or at least essentially external attachment to a filter module and/or separator module 12 is provided. This device 10 (the pre-separator 10) comprises at least one central face 14 as well as side faces 16, 18 laterally adjoining the central face 14 in each case, and the device 10 (the pre-separator 10) is attachable to the respective filter module and/or separation module (12) via the ends of the side faces (16, 18), and for use with a particular filter module and/or separator module 12 is attached thereto at least via the ends of the side faces 16, 18.

LIST OF REFERENCE NUMERALS

- 10 device, pre-separator
- 12 filter module and/or separator module, filter module
- 14 central face (of the pre-separator)
- 14' upper edge (of the central face)
- 16 side face (of the pre-separator)
- 16' upper edge (of the side face)
- 16" lower edge (of the side face)
- 18 side face (of the pre-separator)
- 18' upper edge (of the side face)
- 18" lower edge (of the side face)
- 20 front-side edge (of the pre-separator)
- 22 front-side edge (of the pre-separator)
- 24 flap (at a side face)
- 26 flap (at a side face)
- 28 flap (at the central face)
- 30 inflow opening (at the filter module/into the filter module)
- 32 slot
- 34 slot
- 40 housing
- 42 filter module wall

The invention claimed is:

1. A paint mist separator device comprising:

a pre-separator that comprises:

engaging means for removable external attachment of the pre-separator externally in front of or to a filter module and/or separator module that functions as a paint mist separator, and in a flow path of a raw gas stream, which results during intended use of the filter module and/or separator module, through the filter module and/or separator module, and at least one central face as well as side faces laterally adjoining the central face in each case, wherein the pre-separator is attachable externally to or in front of the respective filter module and/or separation module via the ends of the side faces.

2. The paint mist separator device according to claim 1, including flaps at a free end of each side face as the engagement means for the removable external attachment of the pre-separator to the filter module and/or separator module.

3. The paint mist separator device according to claim 2, wherein the pre-separator is externally attachable to the filter module and/or separator module via engagement of the engagement means with an inflow opening in the filter module and/or separator module.

4. The paint mist separator device according to claim 3, wherein the central face has a width that corresponds to the width of the inflow opening.

5. The paint mist separator device according to claim 1, including flaps at the free end of each side face as the engagement means for the removable external attachment of the pre-separator in front of a filter module and/or separator module that is enclosed by a housing, the flaps being insertable into a gap that remains between the filter module and/or separator module and the surrounding housing.

6. The paint mist separator device according to claim 1, including flaps at a free end of each side face as the engagement means for the removable external attachment of the pre-separator in front of a filter module and/or separator module that is enclosed by a housing, the flaps being laterally and externally attachable to the housing.

7. The paint mist separator device according to claim 2, including hook-shaped flaps.

8. The paint mist separator device according to claim 1, wherein the paint mist separator device is designed in one piece, and pre-perforated bending points form front-side edges of the pre-separator as well as a boundary between the central face and each side face.

9. The paint mist separator device according to claim 1, having a structured surface at least in the area of the central face.

10. A device that includes a filter module and/or separator module and a paint mist separator device according to claim 1 that is attached externally to or externally in front of the filter module and/or separator module.

11. The device according to claim 10, wherein the paint mist separator device is attached externally in front of and externally to the filter module and/or separator module, in that the paint mist separator device is attached externally to the filter module and/or separator module via engagement of the engagement means with an inflow opening in the filter module and/or separator module.

12. The device according to claim 10, wherein the paint mist separator device is attached externally in front of the filter module and/or separator module enclosed by a housing, in that the paint mist separator device is attached via engagement of the engagement means with a gap between the filter module and/or separator module and the housing.

13. The device according to claim 10, wherein the paint mist separator device is attached externally in front of the filter module and/or separator module enclosed by a housing, in that the paint mist separator device is laterally and externally attached to the housing via attachment of the engagement means.

14. A use of a device for separating paint or lacquer particles entrained in a so-called paint mist, the said device comprising a pre-separator that comprises:

at least one central face as well as side faces laterally adjoining the central face in each case, and flaps at the free end of each side face for removable external attachment of the pre-separator externally in front of or to a filter module and/or separator module that functions as a paint mist separator, and in a flow path of a raw gas stream, which results during intended use of the filter module and/or separator module, through the filter module and/or separator module, wherein the pre-separator is attached externally to or in front of the respective filter module and/or separation module via the said flaps, wherein the flaps engage an inflow opening in the filter module and/or separator module or wherein the flaps engage a gap that remains between the filter module and/or separator module and its surrounding housing.

15. The use according to claim 14, wherein the central face has a width that corresponds to the width of the inflow opening.

16. The use according to claim 14, wherein the pre-separator comprises hook-shaped flaps.

17. The use according to claim 14, wherein the pre-separator is designed in one piece, and pre-perforated bending points form front-side edges of the paint mist separator device as well as a boundary between the central face and each side face.

18. The use according to claim 14, wherein the pre-separator has a structured surface at least in the area of the central face.

19. A pre-separator for a filter module and/or separator module that functions as a paint mist separator, and in a flow path of a raw gas stream, which results during intended use of the filter module and/or separator module, prior to entering through the filter module and/or separator module, the pre-separator comprising:

a body having at least one central face as well as side faces laterally adjoining the central face in each case, engaging means for removable external attachment of the body externally in front of or to the filter module and/or separator module, and wherein the body is attachable externally to or in front of the respective filter module and/or separation module via the ends of the side faces, such that the pre-separator is supported external of the filter module and/or separator module.

20. The pre-separator according to claim 1, wherein the engagement means comprises flaps at a free end of at least each side face for removable attachment of the at least each side face to the filter module and/or separator module with the central face supported externally in front of the respective filter module and/or separation module by the at least each side face.

* * * * *